(12) United States Patent
Burkhard et al.

(10) Patent No.: US 9,874,306 B2
(45) Date of Patent: Jan. 23, 2018

(54) LIGHTWEIGHT SUPPORT STRUCTURE, METHOD OF PRODUCING A LIGHTWEIGHT SUPPORT STRUCTURE, COMPOSITE SANDWICH PANEL AND METHOD OF PRODUCING A COMPOSITE SANDWICH PANEL

(71) Applicant: RUAG SCHWEIZ AG, RUAG SPACE, Zürich (CH)

(72) Inventors: Gregor Burkhard, Olten (CH); Dominik Christian Nägeli, Amriswil (CH)

(73) Assignee: RUAG SCHWEIZ AG, RUAG SPACE, Zürich (CH)

( * ) Notice: Subject to any disclaimer, the term of this patent is extended or adjusted under 35 U.S.C. 154(b) by 87 days.

(21) Appl. No.: 14/777,913

(22) PCT Filed: Dec. 10, 2013

(86) PCT No.: PCT/EP2013/076127
§ 371 (c)(1),
(2) Date: Sep. 17, 2015

(87) PCT Pub. No.: WO2014/146739
PCT Pub. Date: Sep. 25, 2014

(65) Prior Publication Data
US 2016/0123524 A1    May 5, 2016

(30) Foreign Application Priority Data

Mar. 20, 2013  (EP) .................................... 13160089

(51) Int. Cl.
*A47B 91/00* (2006.01)
*F16M 13/00* (2006.01)
(Continued)

(52) U.S. Cl.
CPC ............. *F16M 13/00* (2013.01); *B26D 3/065* (2013.01); *B32B 3/12* (2013.01); *B32B 3/266* (2013.01);
(Continued)

(58) Field of Classification Search
CPC ...... F16M 13/00; F16M 2200/08; F16B 5/01; B29L 2031/3076; B29L 2031/3097;
(Continued)

(56) References Cited

U.S. PATENT DOCUMENTS 1,729,705 A    10/1929  Clifford
3,339,609 A *  9/1967  Cushman .................. B64C 1/12
                                                    249/93

(Continued)

FOREIGN PATENT DOCUMENTS

CN    200993140 Y    12/2007
CN    102753767 A    10/2012
(Continued)

OTHER PUBLICATIONS

Office Action and Search Report for Chinese Patent Application 201380074893.8 filed Jun. 2, 2016.
(Continued)

*Primary Examiner* — Gwendolyn Baxter
(74) *Attorney, Agent, or Firm* — Notaro, Michalos & Zaccaria P.C.

(57) ABSTRACT

A lightweight support structure includes a composite sandwich panel having a first face sheet and a lightweight core attached to the face sheet and an essentially rotationally symmetric cut-out extending through the first face sheet and into the lightweight core. The cut-out has an essentially rotationally symmetric inner cut-out and outer cut-out arranged essentially concentric with respect to each other, providing for a support there between. The support has a
(Continued)

core support cut from the lightweight core and a support face sheet disc on top, cut from of the first face sheet. A rotationally symmetric insert is fitted into the cut-out for load application and/or anchorage of various components into and onto the sandwich panel.

20 Claims, 13 Drawing Sheets

(51) Int. Cl.

| | | |
|---|---|---|
| *F16B 5/01* | (2006.01) | |
| *B26D 3/06* | (2006.01) | |
| *B32B 3/12* | (2006.01) | |
| *B32B 3/26* | (2006.01) | |
| *B32B 3/30* | (2006.01) | |
| *B29L 31/30* | (2006.01) | |
| *B29C 65/56* | (2006.01) | |
| *B29C 65/00* | (2006.01) | |
| *B29C 65/02* | (2006.01) | |
| *B29C 65/48* | (2006.01) | |
| *B29C 65/52* | (2006.01) | |

(52) U.S. Cl.
CPC .................. *B32B 3/30* (2013.01); *F16B 5/01* (2013.01); *B29C 65/02* (2013.01); *B29C 65/48* (2013.01); *B29C 65/52* (2013.01); *B29C 65/565* (2013.01); *B29C 66/0224* (2013.01); *B29C 66/12449* (2013.01); *B29C 66/474* (2013.01); *B29C 66/721* (2013.01); *B29C 66/72525* (2013.01); *B29L 2031/3076* (2013.01); *B29L 2031/3097* (2013.01); *B32B 2250/40* (2013.01); *B32B 2305/024* (2013.01); *B32B 2607/00* (2013.01); *F16M 2200/08* (2013.01)

(58) Field of Classification Search
CPC .............. B29C 65/565; B29C 66/0224; B29C 66/12449; B29C 66/474; B29C 66/721; B29C 66/72525; B29C 65/02; B29C 65/48; B29C 65/52; B26D 3/065; B32B 3/12; B32B 3/30; B32B 2250/40; B32B 2305/024; B32B 2607/00
USPC .................. 52/787.1, 787.12, 789.1, 704; 248/346.02; 411/542
See application file for complete search history.

(56) References Cited

U.S. PATENT DOCUMENTS

| | | | | |
|---|---|---|---|---|
| 3,662,805 | A | | 5/1972 | Sygnator |
| 4,076,877 | A | * | 2/1978 | Tanzen ...................... B32B 3/12 156/197 |
| 4,212,610 | A | * | 7/1980 | Weidlich ................... F16B 5/01 244/131 |
| 4,812,193 | A | | 3/1989 | Gauron |
| 5,240,543 | A | * | 8/1993 | Fetterhoff ................. F16B 5/01 156/293 |
| 6,862,863 | B2 | * | 3/2005 | McCorkle ................. F16B 5/01 52/787.1 |
| 9,586,363 | B2 | * | 3/2017 | Siboni ................. B29C 65/4815 |

FOREIGN PATENT DOCUMENTS

| | | |
|---|---|---|
| DE | 102005037615 A1 | 2/2007 |
| JP | 2006076035 A | 3/2006 |
| WO | 93/12344 A1 | 6/1993 |
| WO | 9312344 A1 | 6/1993 |
| WO | 01/34986 A1 | 5/2001 |
| WO | 134986 A1 | 5/2001 |

OTHER PUBLICATIONS

International Search Report for PCT/EP2013/076127 filed on Dec. 10, 2013.

* cited by examiner

LIGHTWEIGHT SUPPORT STRUCTURE, METHOD OF PRODUCING A LIGHTWEIGHT SUPPORT STRUCTURE, COMPOSITE SANDWICH PANEL AND METHOD OF PRODUCING A COMPOSITE SANDWICH PANEL

FIELD OF THE INVENTION

The present invention relates to a lightweight support structure comprising a composite sandwich panel and a load application and/or anchorage element, a method of producing such a lightweight support structure. The present invention further relates to a composite sandwich panel and a method of producing such a composite sandwich panel.

BACKGROUND OF THE INVENTION

Composite sandwich panels are a special type of composite materials/structures fabricated by attaching two relatively thin but stiff face sheets to a lightweight but thick core. The core material is normally of relatively low strength material, but its higher thickness provides the sandwich composite with high bending stiffness with overall low density. Composite sandwich panels are commonly made by layering a core material between two thin layers that provide strength in tension. The lightweight core is usually attached to the face sheets by adhesive bonding and/or metal brazing. This forms a plate-like assembly.

The face sheets are usually laminates of glass and/or carbon fiber-reinforced thermoplastics and/or thermoset polymers such as unsaturated polyesters, epoxies. Alternatively sheet metal, preferably of lightweight metals such as aluminium, may also be employed for face sheets of sandwich panels. The lightweight core of sandwich panels are usually open- and/or closed-cell-structured foams (such as polyvinylchloride, polyurethane, polyethylene or polystyrene foams, syntactic foams) or open- and/or closed-cell metal foams, preferably of lightweight metals such as aluminium.

Quite often honeycomb structures, preferably of lightweight metals such as aluminium or fibreglass and advanced composite materials, are preferred as lightweight core due to their excellent strength to weight ratio. Honeycomb structures are structures that have the geometry of a honeycomb to allow the minimization of the amount of used material to reach minimal weight. The geometry of honeycomb structures can vary widely but the common feature of all such structures is an array of hollow cells formed between thin vertical walls. The cells are often columnar and hexagonal in shape. A honeycomb shaped structure provides a material with minimal density and relative high out-of-plane compression properties and out-of-plane shear properties.

The behaviour of a composite sandwich panels is orthotropic, hence the panels react differently depending on the orientation of the structure. Therefore it is necessary to distinguish between in-plane forces and out-of-plane forces. In a composite sandwich panel the face sheets are provided for transferring in-plane forces while the lightweight core is provided for high out-of-plane compression resistance.

Composite sandwich panels are widely used where flat or slightly curved surfaces are needed and their high strength-to-weight ratio is valuable. They are widely used in the aerospace industry for this reason, and have been featured in aircraft and rockets for long time. While sandwich panels are capable of carrying high loads, load application and/or anchorage of various components requires specific solutions due to said different strength depending on the direction of the applied forces. In order to make full use of the advanced properties of a composite sandwich panel and to avoid damage thereof, the static and dynamic loads from attached components such as lenses, antennas, etc. must be optimally transferred into the structure. As aircrafts, spacecrafts, rockets, satellites, etc. are subject to strong vibrations on the order of up to 100 g, the loads on the attachment points of components to the sandwich panels carrying them are very high.

To satisfy these strict requirements, the anchorage of components and load application may be achieved by means of inserts fitted into the sandwich structure, such as the insert disclosed in GB 1328429. At the same time, the inserts should be fitted to sit flatly within the composite sandwich panel. This process is currently performed mainly by hand or by complex processes involving labour-intensive production steps requiring various tools and auxiliary means. For example the insert of GB 1328429 is mounted by using an auxiliary plate parallel to the face sheet of the composite sandwich panel, the auxiliary plate being attached to the insert during its insertion into the panel and during the curing of the adhesive which adheres the insert into the panel. However, this can take up to 48 hours which makes this process very inefficient. Furthermore quite often accidental leakage of the adhesive might bond the auxiliary plate to the insert, which might lead to the insert being stressed or in the worst case even pulled out of the sandwich panel during removal of the auxiliary plate, thereby damaging the entire sandwich panel. In addition, known inserts for load application into composite sandwich panels must be very precisely aligned with the cut-outs into which they are mounted, making automated assembly impossible or very costly.

Technical Problem to be Solved

The objective of the present invention is thus to provide a lightweight support structure and corresponding method of producing a lightweight support structure comprising a composite sandwich panel which allows safe and strong anchorage of various components and optimal load application into such composite sandwich panels while drastically reducing the efforts of providing such without the need of various tools and aids.

A further objective of the present invention is to provide a composite sandwich panel and corresponding method of producing a composite sandwich panel suitable for receiving an insert allowing the provision of safe and strong anchorage of various components and optimal load application into such composite sandwich panels.

SUMMARY OF THE INVENTION

The above identified objective of providing a lightweight support structure which allows safe and strong anchorage of various components and optimal load application into such composite sandwich panels while drastically reducing the efforts of providing such without the need of various tools and aids is achieved by a lightweight support structure comprising a composite sandwich panel. The composite sandwich panel comprising a first face sheet for transferring in-plane forces; a lightweight core configured for high transverse shear strength, said lightweight core being attached to the face sheet, the composite sandwich panel further comprising an essentially rotationally symmetric cut-out extending through the first face sheet and into said lightweight core. The cut-out in the composite sandwich panel comprises an essentially rotationally symmetric inner cut-out and an essentially rotationally symmetric outer cut-out arranged essentially concentric with respect to each other, providing for a support inbetween, said support comprising a core support cut from said lightweight core and a support face sheet disc on top, cut from of said first face sheet. In addition, the lightweight support structure further comprises an essentially rotationally symmetric insert fitted into said cut-out for load application and/or anchorage of various components into, respectively onto the composite sandwich panel, the core support being preferably compressed so as to allow said insert to lie flatly inside the composite sandwich panel.

The objective of the present invention of providing a method of producing a lightweight support structure comprising such a composite sandwich panel which allows safe and strong anchorage of various components and optimal load application into such composite sandwich panels while drastically reducing the efforts of providing such without the need of various tools and aids is solved by a method of producing a lightweight support structure comprising the steps:

providing a composite sandwich panel having: a first face sheet for transferring in-plane forces; a lightweight core attached to the first face sheet, cutting an essentially rotationally symmetric inner cut-out and an essentially rotationally symmetric outer cut-out into said composite sandwich panel by cutting through the first face sheet and into said lightweight core, wherein the inner cut-out and the outer cut-out are arranged essentially concentric with respect each other, by cutting said inner cut-out and outer cut-out, providing a support inbetween, said support comprising a core support cut from said lightweight core and a support face sheet disc on top, cut from of said first face sheet;

fitting a rotationally symmetric insert into said cut-out for load application and/or anchorage of various components into respectively onto the composite sandwich panel.

The cut-out is configured for receiving a rotationally symmetric insert for load application and/or anchorage of various components into respectively onto the composite sandwich panel while said support is configured for stabilizing said insert within the composite sandwich panel.

The above identified objective of providing a composite sandwich panel suitable for receiving an insert allowing the provision of a safe and strong anchorage of various components and optimal load application into such composite sandwich panels is achieved by a composite sandwich panel comprising: a first face sheet for transferring in-plane forces and a lightweight core attached to the first face sheet. The composite sandwich panel is provided with rotationally symmetric cut-out extending through the first face sheet and into said lightweight core. The insert cut-out comprises an essentially rotationally symmetric inner cut-out and an essentially rotationally symmetric outer cut-out arranged essentially concentric with respect to each other, providing for a support inbetween, comprising a core support cut from said lightweight core and a support face sheet disc, cut from of said first face sheet. The cut-out is configured for receiving a rotationally symmetric insert for load application and/or anchorage of various components into respectively onto the composite sandwich panel, preferably by form-fitting and/or force-fitting while the support is configured for stabilizing said insert within the composite sandwich panel.

The above identified objective of providing a method of producing a composite sandwich panel suitable for receiving an insert allowing the provision of a safe and strong anchorage of various components and optimal load application into such composite sandwich panels is achieved by a method of producing a composite sandwich panel comprising the steps of:

providing a composite sandwich panel having a first face sheet for transferring in-plane forces and a lightweight core attached to the first face sheet;

cutting an essentially rotationally symmetric inner cut-out and an essentially rotationally symmetric outer cut-out into said composite sandwich panel by cutting through the first face sheet and into said lightweight core, wherein the inner cut-out and the outer cut-out are arranged essentially concentric with respect each other;

by cutting said inner cut-out and outer cut-out, providing a support inbetween, said support comprising a core support cut from said lightweight core and a support face sheet disc on top, cut from of said first face sheet;

configuring said cut-out for receiving a rotationally symmetric insert for load application and/or anchorage of various components into respectively onto the composite sandwich panel, preferably by form-fitting and/or force-fitting; and configuring said support for stabilizing said insert within the composite sandwich panel.

Advantageous Effects

The most important advantage of the present invention is that the lightweight support structure respectively the composite sandwich panel can be provided with a strong and precise anchorage of various components and optimal load application into such composite sandwich panels while drastically reducing the efforts of providing such without the need of various tools and aids.

BRIEF DESCRIPTION OF THE DRAWINGS

Further characteristics and advantages of the invention will in the following be described in detail by means of the description and by making reference to the drawings. Which show.

Note: The figures are not drawn to scale, are provided as illustration only and serve only for better understanding but not for defining the scope of the invention. No limitations of any features of the invention should be implied form these figures.

DESCRIPTION OF PREFERRED EMBODIMENTS

Certain terms will be used in this patent application, the formulation of which should not be interpreted to be limited by the specific term chosen, but as to relate to the general concept behind the specific term.

Figure 1:
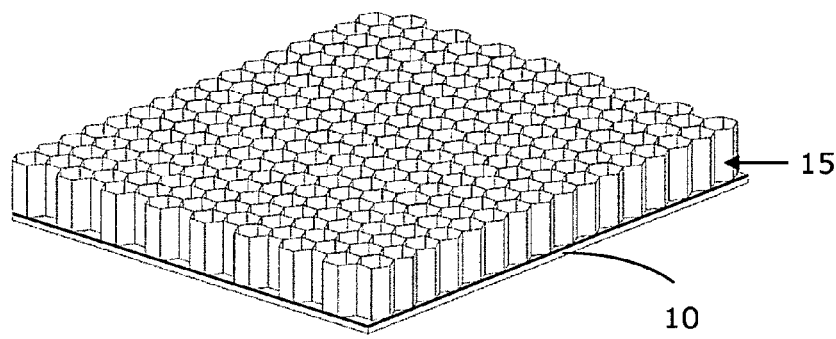
FIG. 1 a perspective view of a known composite sandwich panel.
Figure 2A:
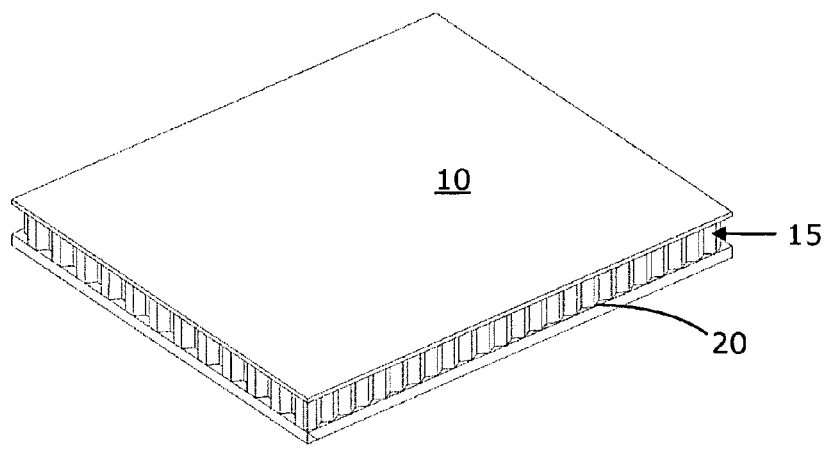
FIG. 2A a perspective view of a known preferred composite sandwich panel with a first and a second face sheet.
Figure 2B:
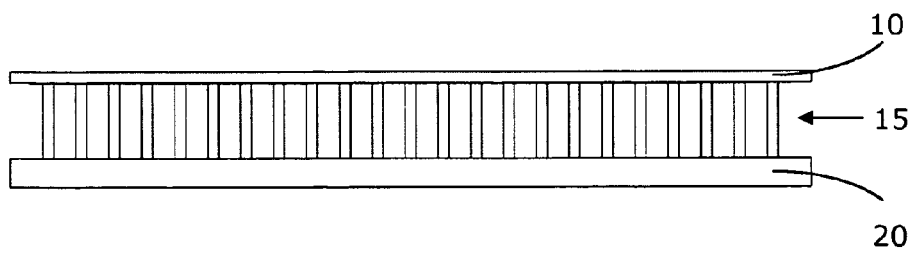
FIG. 2B a side view of the known preferred composite sandwich panel of FIG. 2A.

FIG. 1 shows a perspective view of a composite sandwich panel with a face sheet 10 and a lightweight core 15 while FIG. 2A shows a perspective view of a composite sandwich panel with a first face sheet 10 and a second face sheet 20 with the lightweight core 15 inbetween. While sandwich panels with two face sheets are more common and also preferred, the present inventive concept is applicable to composite sandwich panels with only one face sheet 10. FIG. 2B shows a side view of the same preferred composite sandwich panel 5 of FIG. 2A. The composite sandwich panel 5 (without the inventive cut out described later) itself is produced by known methods by attaching the relatively thin but stiff face sheets 10, 20 to the lightweight but thick core 15. The core material is normally of relatively low strength material, but its higher thickness provides the sandwich composite with high bending stiffness with overall low density. The Composite sandwich panel 5 is preferably made by layering a lightweight core 15 between the two thin face sheets 10, 20 that provide strength in tension.

The face sheets 10, 20 of the composite sandwich panel 5 comprise(s) one or more of the following:
- laminates of glass and/or carbon fiber-reinforced thermoplastics and/or thermoset polymers such as unsaturated polyesters, epoxies; and/or
- sheet metal, preferably of lightweight metals such as aluminium.

Figure 2C:
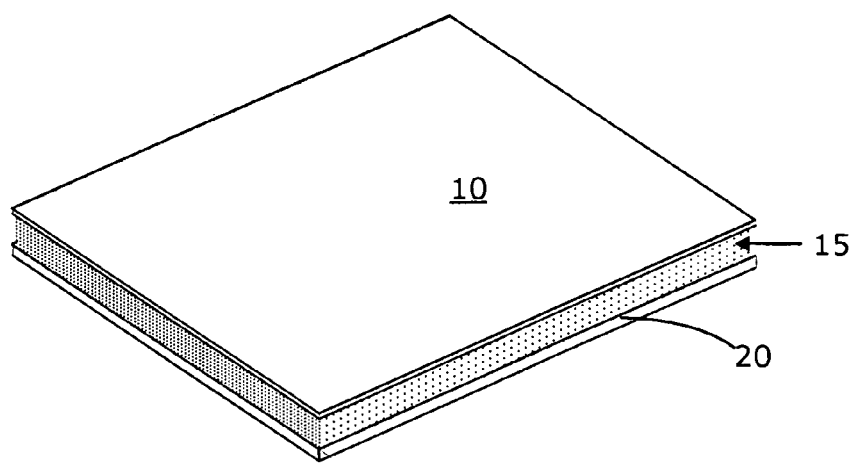
FIG. 2C a perspective view of a known preferred composite sandwich panel with a first and a second face sheet.

While most figures (except for FIG. 2C) show a honeycomb structure as the lightweight core 15, the lightweight core 15 of the present invention comprises (but is not limited to) one or more of the following:
- open- and/or closed-cell-structured foams such as polyvinylchloride, polyurethane, polyethylene or polystyrene foams, syntactic foams;
- open- and/or closed-cell metal foam, preferably of lightweight metals such as aluminium;
- honeycomb structures, preferably of lightweight metals such as aluminium or fibreglass and advanced composite materials.

The lightweight core 15 is preferably attached to the first face sheet 10 and/or said second face sheet 20 by adhesive bonding and/or metal brazing. An alternative lightweight core 15 in the form of a foam is illustrated on FIG. 2C.

Figure 3A:
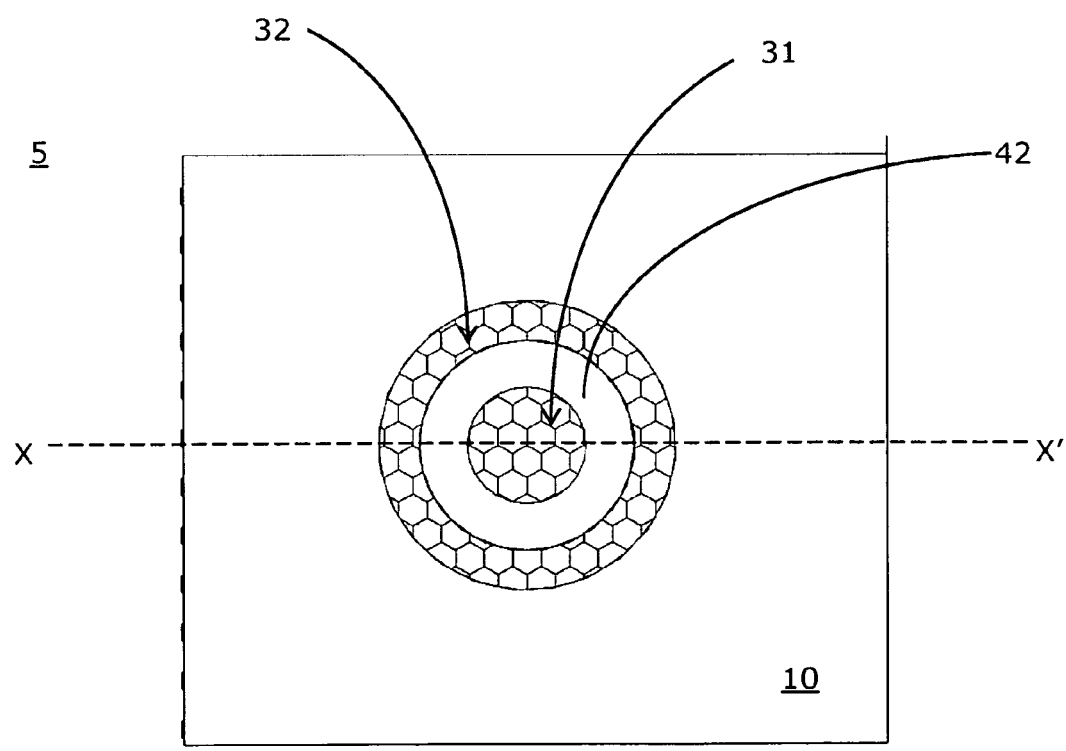
FIG. 3A a top view of a composite sandwich panel according to the present invention.
Figure 3B:
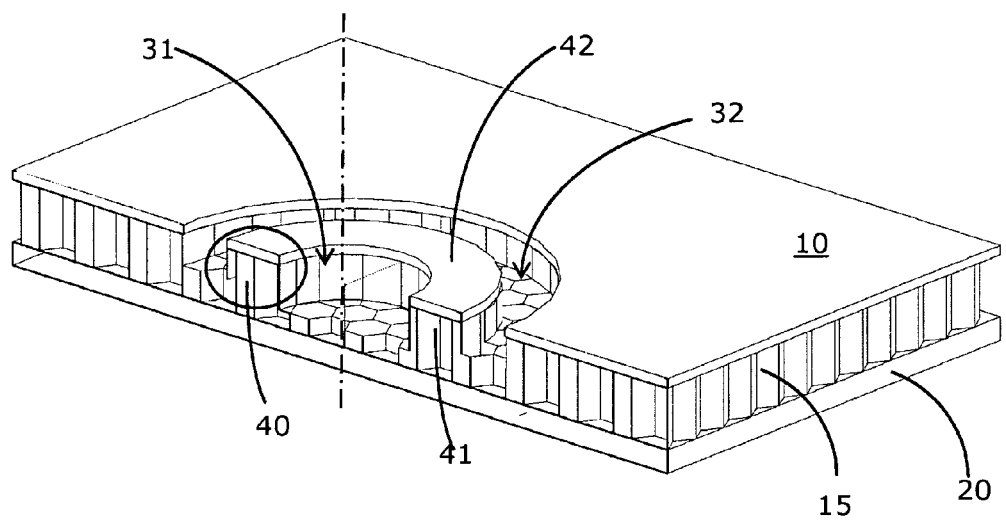
FIG. 3B a perspective view of the cross section along X-X' of the composite sandwich panel of FIG. 3A.
Figure 3C:
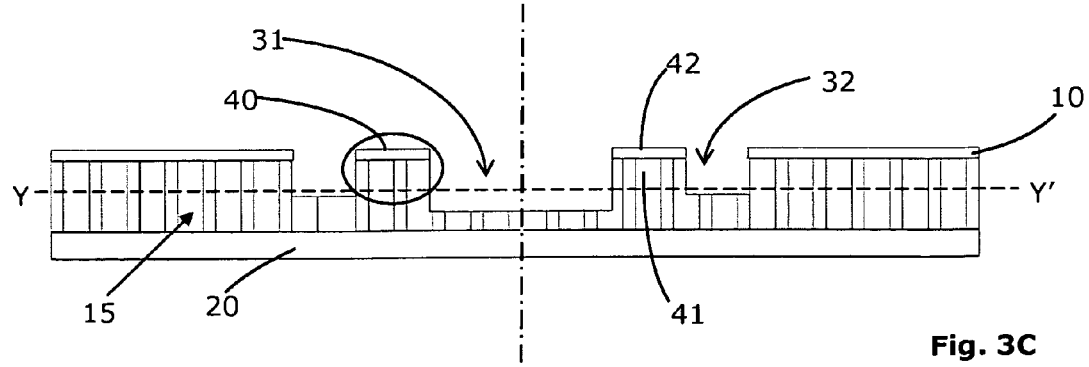
FIG. 3C a lateral cross section along X-X' of the composite sandwich panel of FIG. 3A.

FIG. 3A depicts a top view of a composite sandwich panel 5 according to the present invention further comprising an essentially rotationally symmetric cut-out 30, the cut-out 30 comprising an essentially rotationally symmetric inner cut-out 31 and an essentially rotationally symmetric outer cut-out 32 arranged essentially concentric with respect to each other, providing for a support face sheet disc 42 (part of the support 40 as shown in FIGS. 3B and 3C) cut out of said first face sheet 10.

As seen on FIG. 3A, by removing material of the first face sheet 10 on the surface of the support face sheet disc 42 of the cut-out 30, the lightweight core 15 is revealed.

FIGS. 3B and 3C show a perspective respectively a lateral view of the cross section along X-X' of the composite sandwich panel of FIG. 3A. The support 40 formed between the concentrically arranged inner cut-out 31 and outer cut-out 32 is well illustrated on these figures showing how the cut-out 30 extends through the first face sheet 10 and into said lightweight core 15. Therefore a core support 41 of the support 40 is formed from the lightweight core 15 material between the inner cut-out 31 and outer cut-out 32. In embodiments where the lightweight core 15 is a honeycomb structure, the size and geometry of the individual cells of the honeycomb structure are chosen so that the core support 40 firmly supports the support face sheet disc 42 on top.

Figure 3D:
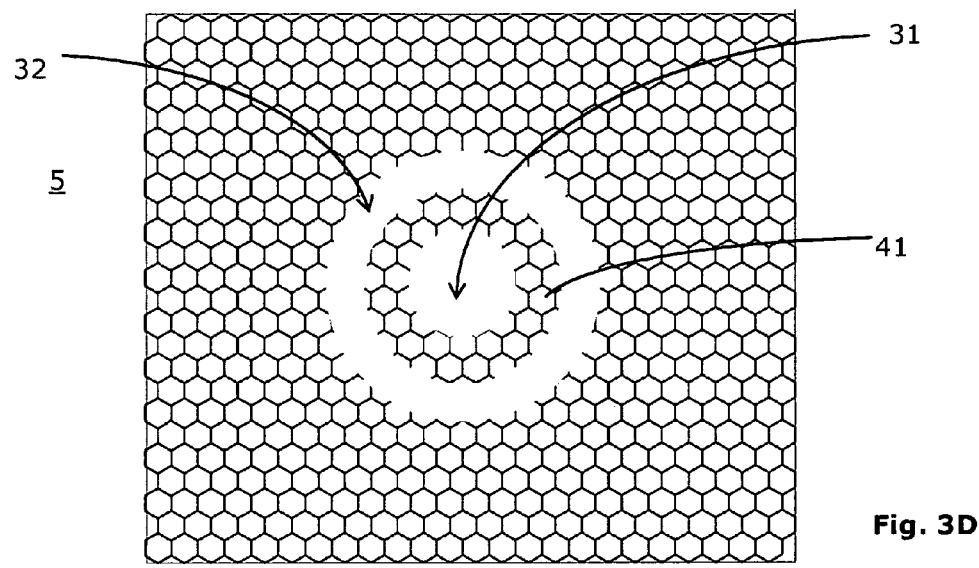
FIG. 3D a top view of a cross section of the composite sandwich panel along Y-Y' of FIG. 3C.
Figure 3E:
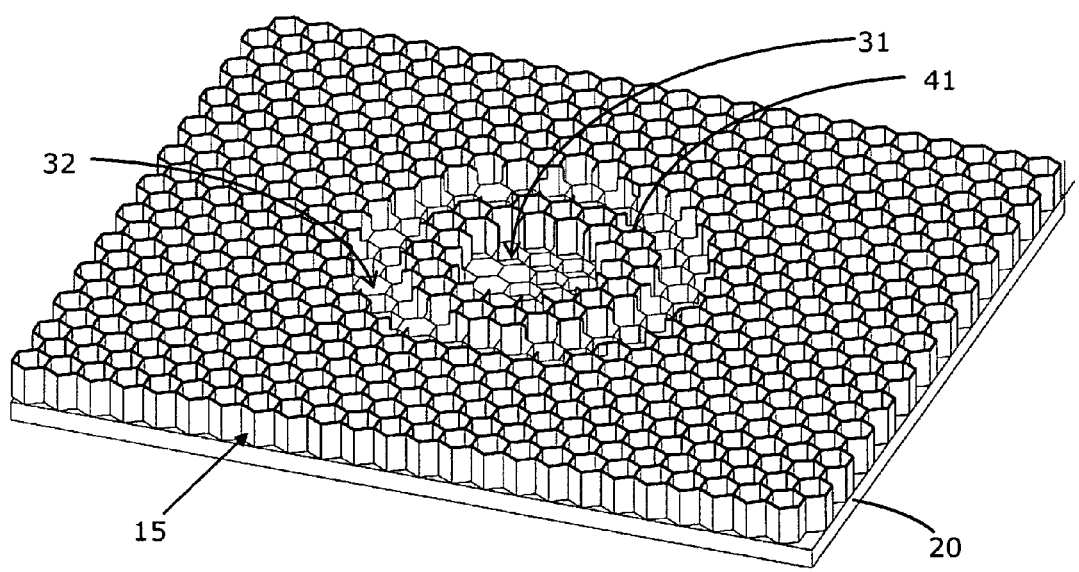
FIG. 3E a perspective view of a cross section of the composite sandwich panel along Y-Y' of FIG. 3C.

As illustrated on the figures, according to the most advantageous embodiment of the present invention, the outer cut-out 32 is cut as an essentially hollow cylinder (tubular) while the inner cut-out is 31 is cut as an essentially solid cylinder. Nonetheless, due to the potential non-homogeneity of the lightweight core 15, the outer cut-out 32 and the inner cut-out 31 (resulting form said hallow respectively solid cylindrical cuts) do not necessarily have cylindrical outer surfaces. For this reason, the outer cut-out 32 respectively the inner cut-out 31 are referred to in the present application as essentially rotationally symmetric cut-outs. This is well illustrated on FIGS. 3D and 3E which show a top view respectively a perspective view of a cross section of the composite sandwich panel 5 along Y-Y' of FIG. 3C. As seen here, the outer surfaces of the outer cut 32 respectively inner cut 31 are defined by the lightweight core 15 where some of its potentially non-homogeneous structure is removed (during the cut-out). In the example illustrated on the figures, the outer surface of the cut-outs 31, 32 in the case of a honeycomb lightweight core 15 is defined by intact and/or partially cut-away "incomplete" hexagonal honeycomb cells.

Figure 4A:
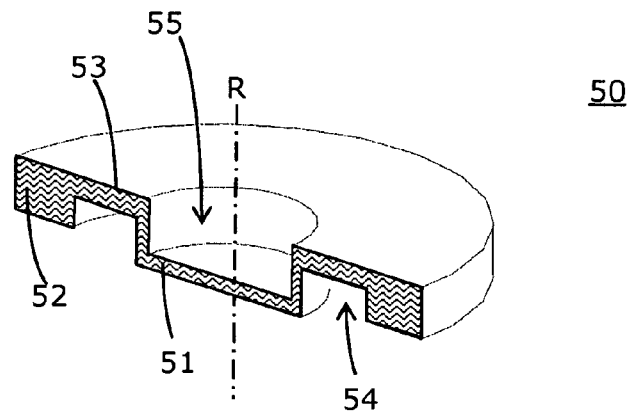
FIG. 4A a perspective cross section of an insert according to the present invention.
Figure 4B:
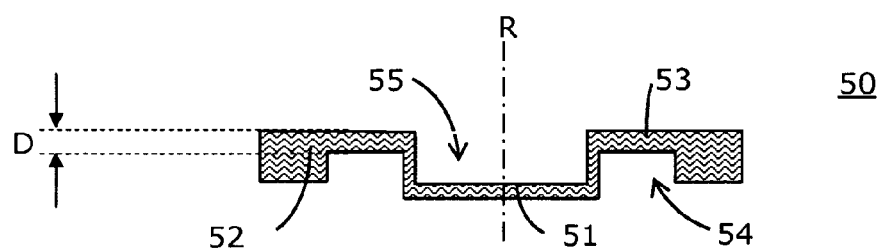
FIG. 4B a lateral cross section of the insert of FIG. 4A.

FIGS. 4A and 4B depict a perspective, respectively a lateral cross section of an insert 50 according to the present invention. The insert 50 serves the purpose of load application and/or anchorage of various components into respectively onto a composite sandwich panel 5. Said various components include but are not limited to various antennas, optical elements such as mirrors or lenses, etc.

The insert 50 is configured such as to fit into the cut-out 30 in the composite sandwich panel 5. Accordingly, the insert 50 comprises an essentially rotationally symmetrical inner insert ring 51 and outer insert ring 52 corresponding to the inner cut-out 31 respectively outer cut-out 32 of the composite sandwich panel 5. The illustrated insert 50 and its inner respectively outer insert rings 51, 52 are of a cylindrical shape. However, conical shapes can be also beneficial. Furthermore, the outer insert ring 52 is arranged with respect to said inner insert ring 51 such that as to provide an insert trench 54 inbetween for receiving the support 40 of the composite sandwich panel 5.

The inner insert ring 51 and an outer insert ring 52 are connected by an insert connecting portion 53 inbetween. The insert connecting portion 53 is preferably flat so that the insert 50 may be fitted flat within the composite sandwich panel 5. Furthermore the thickness of the insert connecting portion 53 is chosen to correspond to a compression depth of the lightweight core 15 of the composite sandwich panel 5 (described below with reference to FIGS. 10A and 10B). Thus, by choosing the thickness of the insert connecting portion 53 to correspond to a compression depth of the lightweight core 15, the insert 50 can be completely sunk into the composite sandwich panel 5 without protruding therefrom.

In its most preferred embodiment, the insert 50 comprises a receiving area 55 for receiving a fixture 100 for attaching and/or anchoring of various components into respectively onto the composite sandwich panel 5. The figures show a receiving area 55 as a cylindrical opening in the insert 50 partially within the inner insert ring 51. Fixtures may be attached to the receiving area 55 by form-fitting, press-fitting, by means of adhesive, by means of a thread therein, etc. In a particularly preferred embodiment, the receiving area 55 of the insert 50 is provided with a distorted thread to prevent the fixture 100 thread-locked therein from loosening due to vibrations.

A particularly preferred embodiment of the insert 50 is a self-cutting insert 50 wherein the inner insert ring 51 and outer insert ring 52 are at least partially provided with an abrasive coating (such as diamond particle coating) and/or a saw-tooth geometry. By rotating the insert 50 around its symmetry axis, the insert 50 is able to cut the inner cut-out 31 and an outer cut-out 32 into the composite sandwich panel 5 by cutting through the first face sheet 10 and into said lightweight core 15. After self-cutting the cut-out 30, the self-cutting insert 50 is fit into the cut-out 30, preferably by form-fitting and/or force-fitting and/or by means of an adhesive.

Figure 4C:
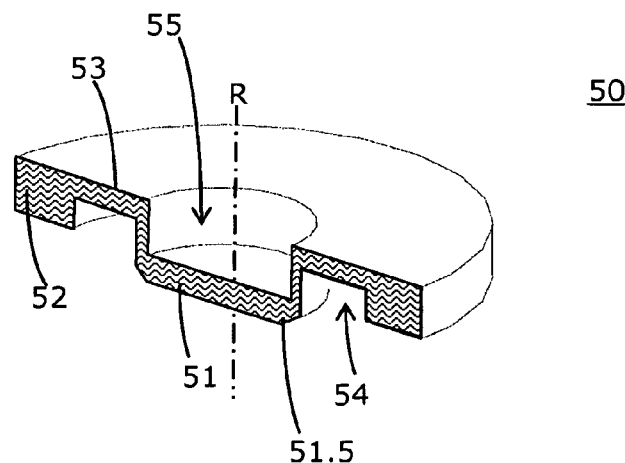
FIG. 4C a perspective cross section of a further embodiment of the insert according to the present invention.
Figure 4D:
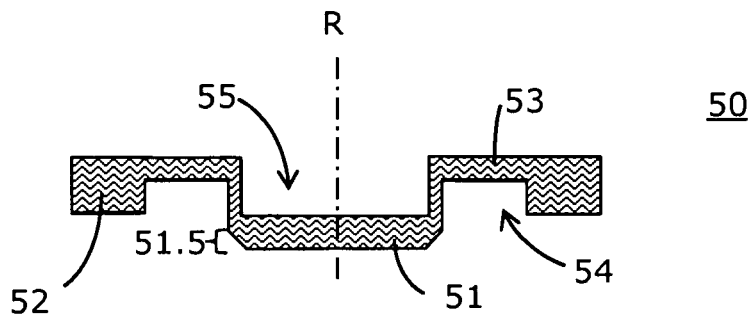
FIG. 4D a lateral cross section of the insert of FIG. 4C.
Figure 4E:
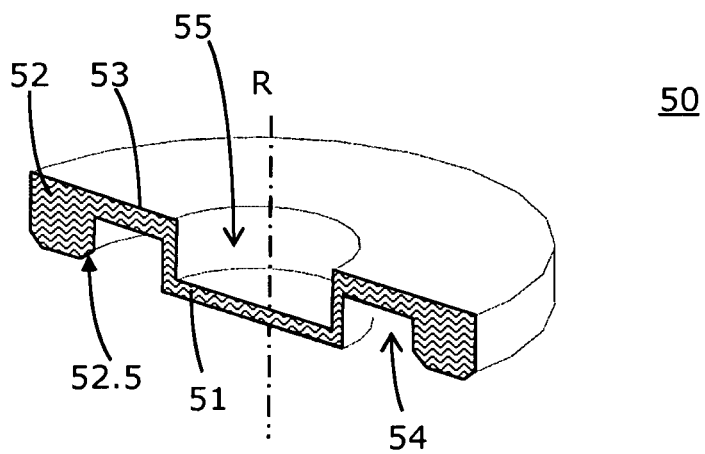
FIG. 4E a perspective cross section of a further embodiment of the insert according to the present invention.
Figure 4F:
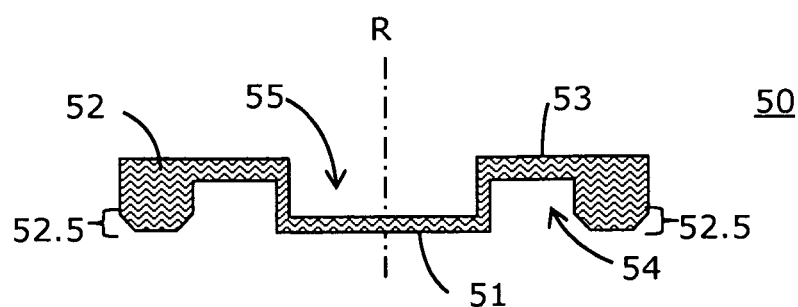
FIG. 4F a lateral cross section of the insert of FIG. 4E.

Figures FIGS. 4C and 4D show a perspective respectively a lateral cross section of a self-aligning insert 50 according to the present invention wherein the inner insert ring 51 comprises a tapered conical section 51.5 provided for precisely aligning the insert 50 with the cut-out 30 upon its insertion into the composite sandwich panel 5. Alternatively or additionally the outer insert ring 52 may also comprise a tapered conical section 52.5 at its lower end for aligning the insert 50 with the cut-out 30 upon its insertion into the composite sandwich panel 5, as illustrated on FIGS. 4E and 4F.

The self-alignment of the insert 50 allows an automated mounting of the insert 50 into the composite sandwich panel 5. Furthermore, the self-alignment allows for a very tight fit of the insert 50 within the cut-out 30, which in turn prevents leakage of adhesive. At the same time, the tight fit of the insert 50 within the cut-out 30 ensures that the insert 50 must not be stabilised within the composite sandwich panel 5, even if the adhesive (or other alternative means of securing the insert) has not yet reached it final bonding.

Figure 5A:
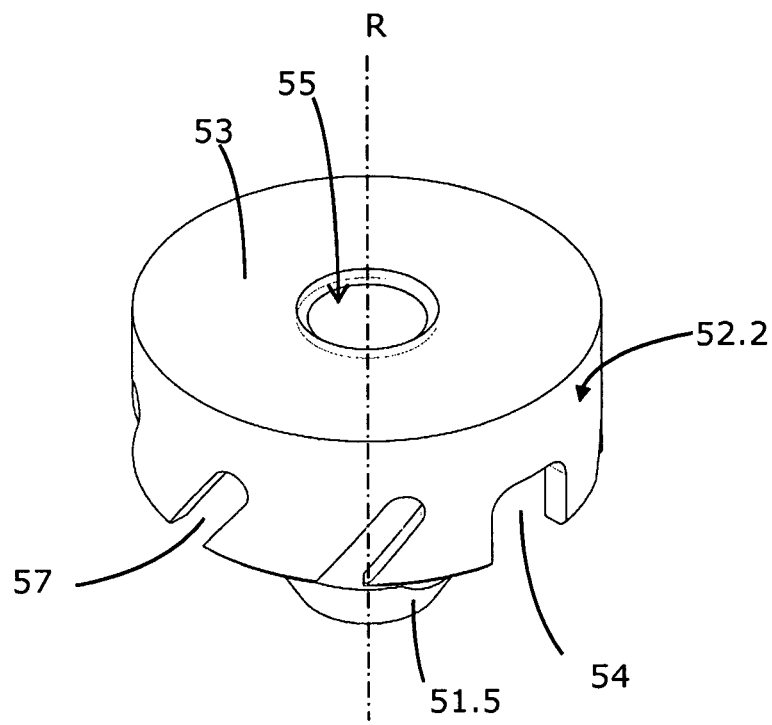
FIG. 5A a perspective view of a particularly preferred embodiment of the insert.
Figure 5B:
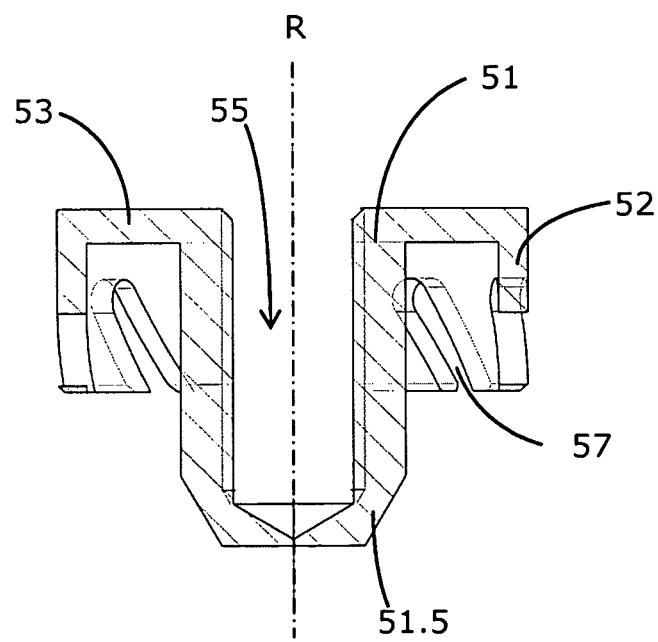
FIG. 5B a lateral cross section of the insert of FIG. 5A.

FIGS. 5A and 5B show a perspective view respectively a lateral cross section of a particularly preferred embodiment of the self-aligning insert 50 according to the present invention.

Figure 6A:
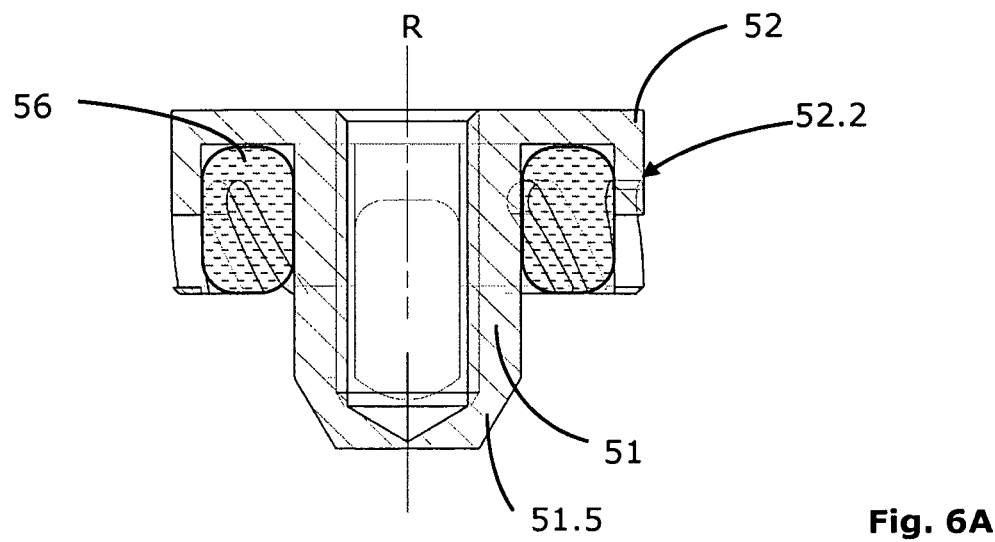
FIG. 6A a lateral cross section of an even further embodiment of the insert.

FIG. 6A shows a lateral cross-section of a further preferred embodiment of the self-cutting insert 50 which comprises a self-contained adhesive 56 arranged and configured for adhering the insert 50 into said cut-out 30 upon introduction therein. The self-contained adhesive 56 is preferably provided in said trench 54 between the inner insert ring 51 and outer insert ring 52. In order for the adhesive 56 to reach the outer surface 52.2 of the outer insert ring 52 upon application of pressure, the outer insert ring 52 is provided at least one channel 57—preferably multiple channels 57—extending from the trench 54 through the outer insert ring 52.

Figure 6B:
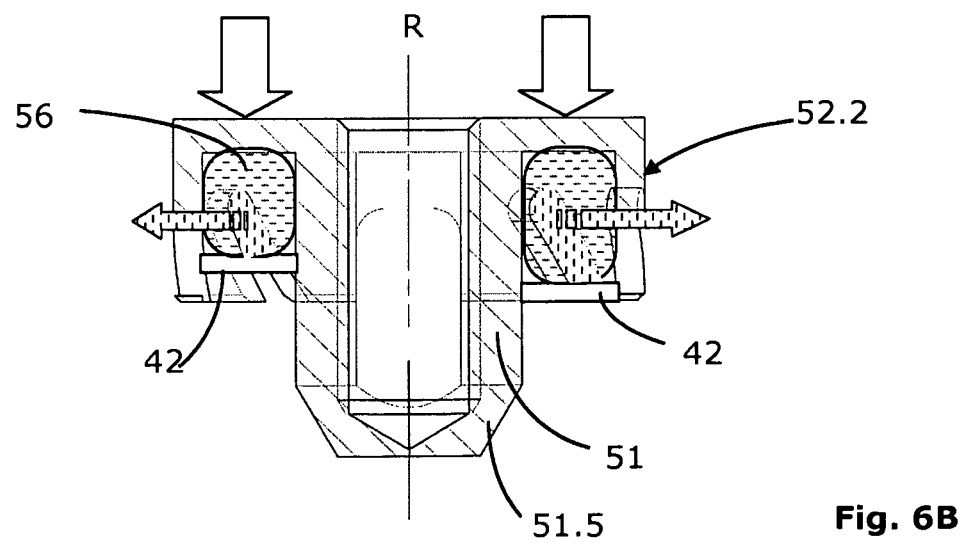
FIG. 6B a lateral cross section illustrating the dispersion of the adhesive as an insert with self-contained adhesive is fitted into a composite sandwich panel.

As is illustrated on FIG. 6B, when the insert 50 is pressed into the cut-out 30 of a composite sandwich panel 5, the adhesive 56 is forced into the channel 57 due to the pressure created by gradually decreasing the space defined by the lower side of the insert connecting portion 53, the outer surface of the inner insert ring 51, the inner surface of the outer insert ring 52 and the support face disc 42.

As seen on FIGS. 5A through 6B, the channels 57 are preferably provided at an angle with respect to the rotational axis R of the insert 50, thereby ensuring that upon insertion of the insert 50 into the cut-out 30 of the composite sandwich panel 5, the adhesive is spread around (at least a considerable portion of) the circumference of the outer insert ring 52.

Figure 7A:
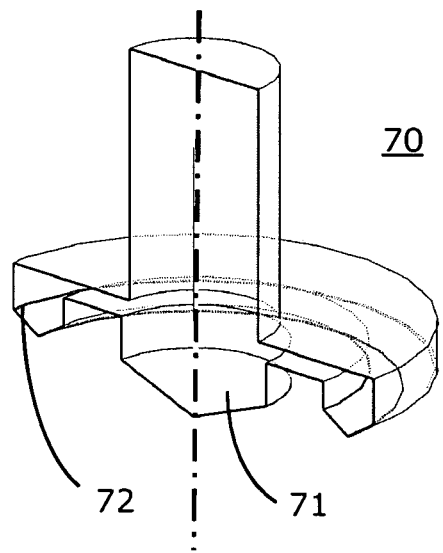
FIG. 7A a perspective cross section of a cutter tool according to the present invention.
Figure 7B:
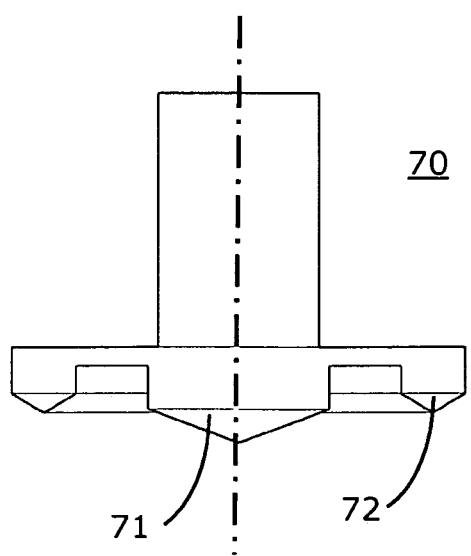
FIG. 7B a lateral cross section of the cutter tool of FIG. 7A.

FIGS. 7A and 7B show a perspective, respectively a lateral cross section of a cutter tool 70 for cutting the inner cut-out 31 and outer cut-out 32 into the composite sandwich panel 5 by rotation around its vertical symmetry axis. The cutter tool 70 comprises an inner cutting ring 71 and an outer cutter ring 72 corresponding to said inner cut-out 31 respectively said outer cut-out 32.

Figure 8A:
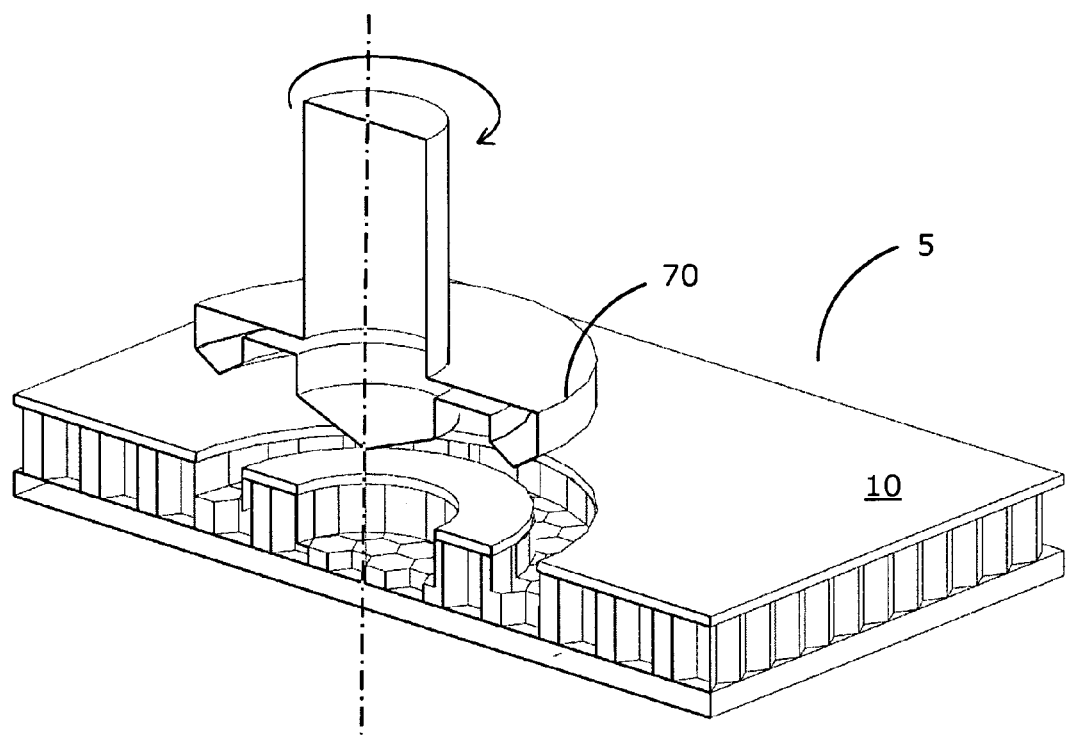
FIG. 8A a perspective cross section illustrating the method step of cutting a cut-out into the composite sandwich panel using a cutter tool.
Figure 8B:
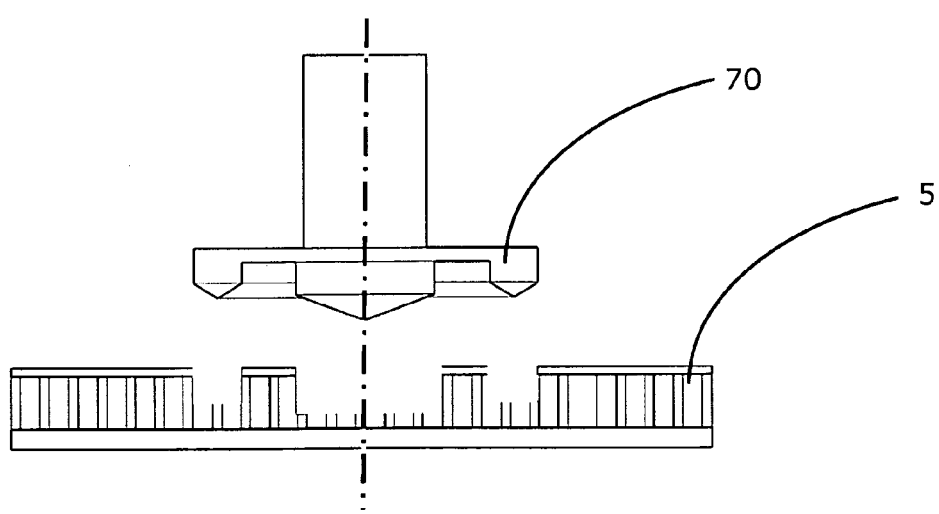
FIG. 8B a lateral cross section illustrating the method step of cutting a cut-out into the composite sandwich panel using a cutter tool.

FIGS. 8A and 8B illustrate the cutting of the insert cut-out 30 into the composite sandwich panel 5 using the cutter tool 70. As shown, the cutter tool 70 cuts through the first face sheet 10 and then penetrates into the lightweight core and removes a portion of it, thereby forming the inner respectively outer cut-outs 31, 32.

Figure 9A:
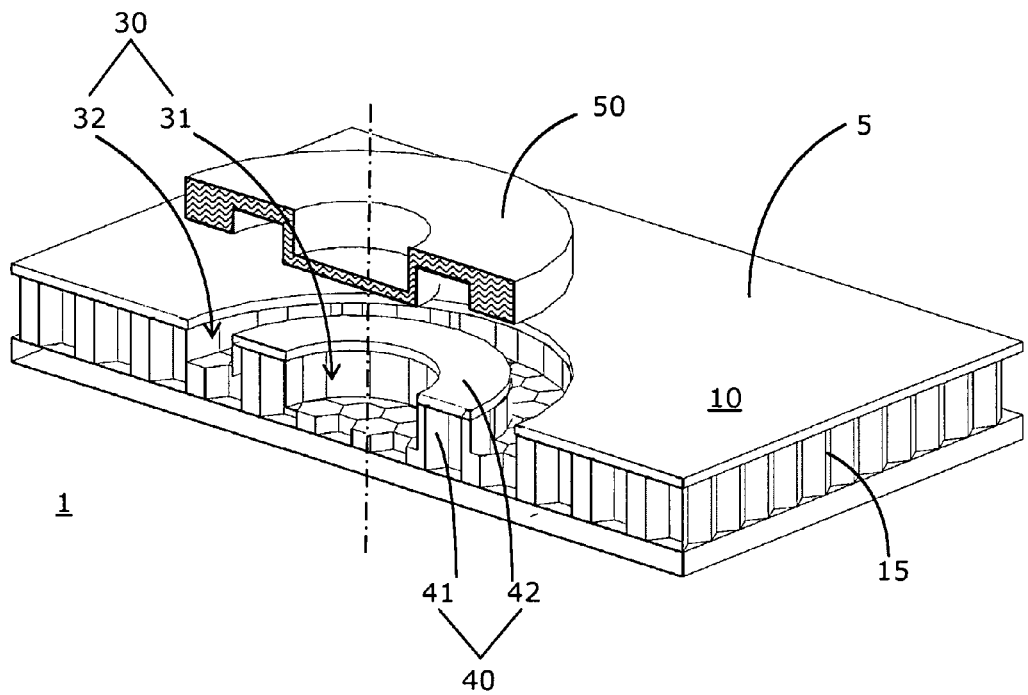
FIG. 9A a perspective cross section illustrating an insert just before being fitted into a composite sandwich panel.

FIG. 9A shows a perspective cross section illustrating the insert 50 just before being fitted into a composite sandwich panel 5.

Figure 9B:
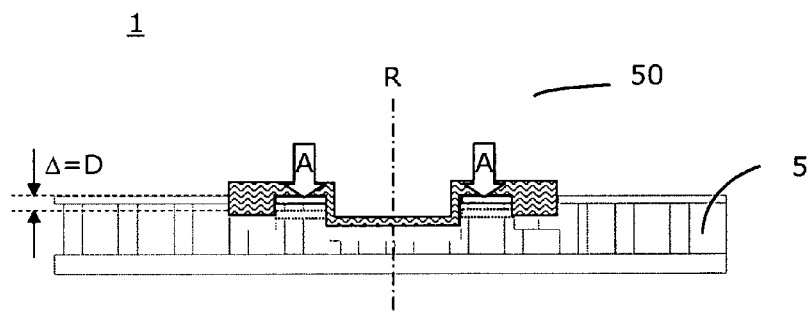
FIG. 9B a lateral cross section illustrating an insert just before being fitted into a composite sandwich panel.

FIG. 9B depicts a lateral cross section illustrating a preferred embodiment of the present invention, according to which when the insert 50 is fitted into the composite sandwich panel 5, it compresses the lightweight core material 15 of the core support 41 by means of said insert connecting portion 53 exercising pressure on the support face sheet disc 42, illustrated by block arrows A. The core support 41 is preferably compressed by a compression Δ equal to the thickness D of the insert connecting portion 53, the resulting position of the support face sheet disc 42 being illustrated by dotted lines. As a result, the insert 50—once fitted—may lie flatly inside said composite sandwich panel 5 as shown on FIGS. 10A and 10B.

Figure 9C:
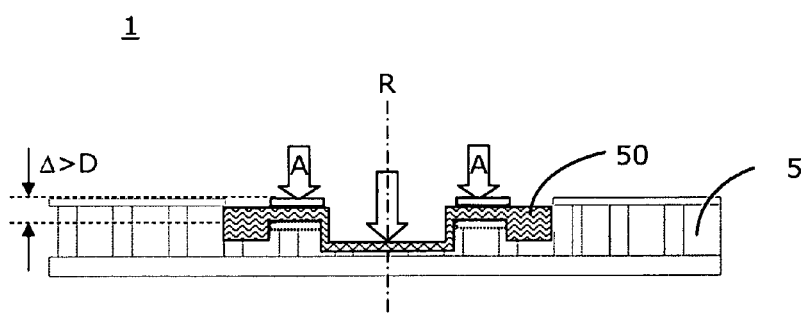
FIG. 9C a lateral cross section illustrating an insert being pressed into a composite sandwich panel.
Figure 9D:
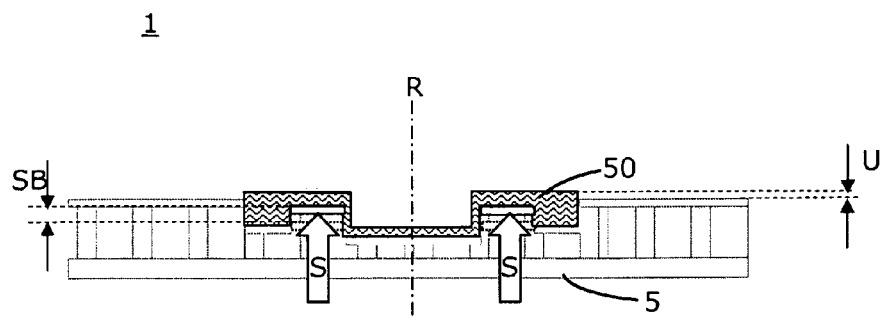
FIG. 9D a lateral cross section illustrating a "spring-back" effect of the core material of the composite sandwich panel as an insert is pressed therein.

As illustrated on FIG. 9C, depending on the elasticity of the lightweight core 15, the compression Δ of the core support 41 can be chosen greater than the thickness D of the insert connecting portion 53 so as to compensate for the "spring-back"—illustrated on FIG. 9D by block arrows S—effect of the core material. Due to the potentially inhomogeneous nature of the core material, it is often impossible to predict the elasticity of the core support 41, i.e. the amount of "spring-back". Therefore according to a particularly preferred method of fitting the insert 50 into the composite sandwich panel 5, the insert 50 is pressed into the cut-out 30 with an initial compression Δ equal to or just slightly greater than the thickness D of the insert connecting portion 53. Then the spring-back SB of the core support 41 is measured—preferably as an the unevenness U between the top of the insert 50 and the first face sheet 10. The compression Δ is increased and the above steps repeated as long as the measured unevenness U is above a predefined unevenness tolerance. The present invention allows an unevenness tolerance on the order of 1/100 mm.

Figure 10A:
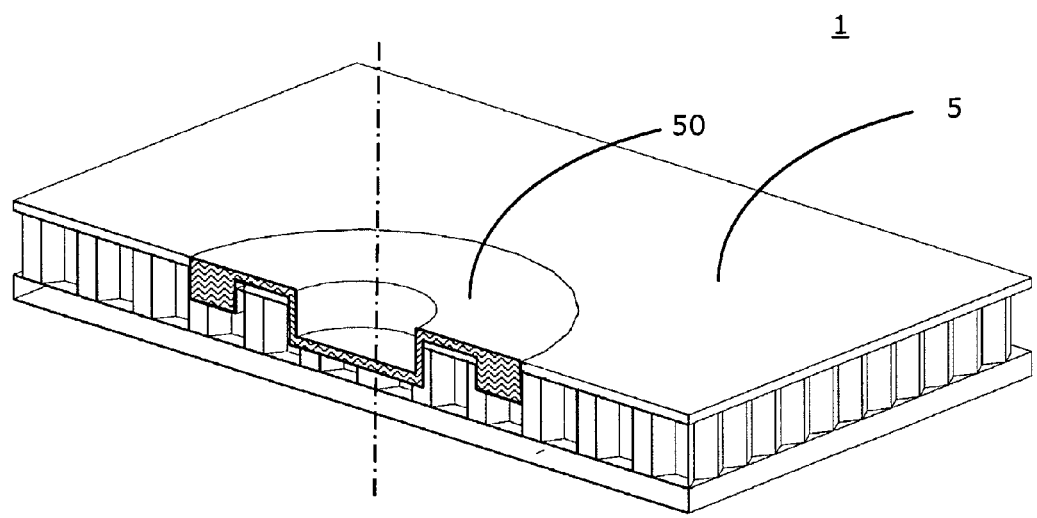
FIG. 10A a perspective cross section of a lightweight support structure comprising an insert fitted into a composite sandwich panel.
Figure 10B:
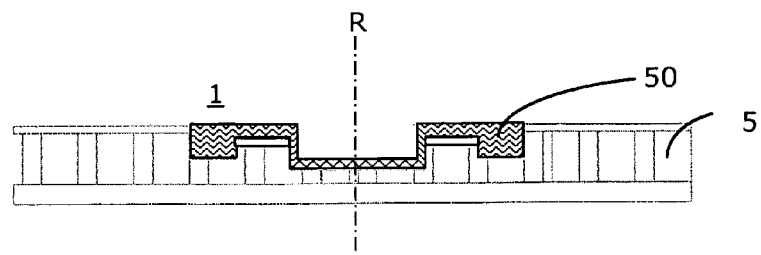
FIG. 10B a lateral cross section of a lightweight support structure comprising an insert fitted into a composite sandwich panel.

FIGS. 10A and 10B show a perspective respectively a lateral cross section of the lightweight support structure 1 according to the present invention, comprising the insert 50 fitted flatly into the composite sandwich panel 5.

Figure 11A:
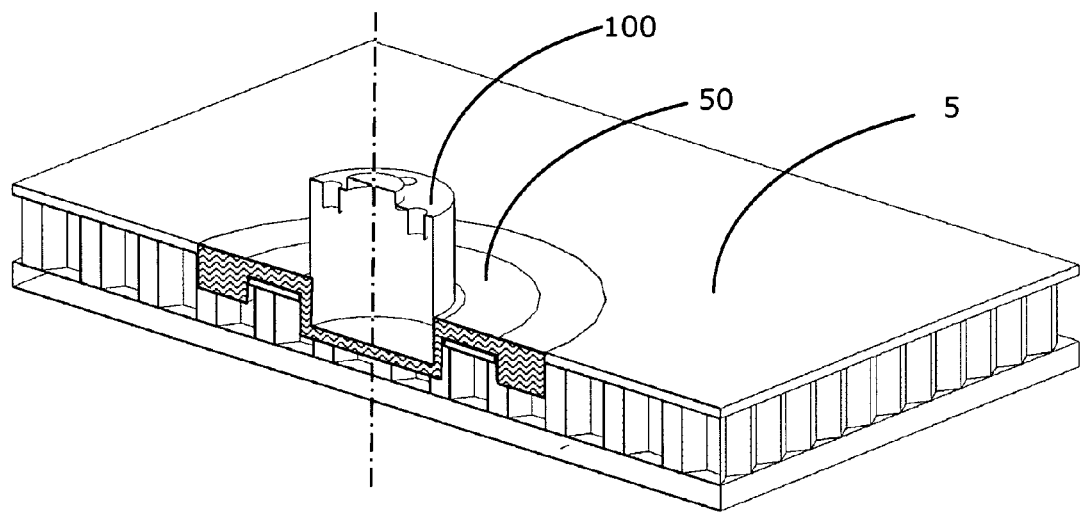
FIG. 11A a perspective cross section of a lightweight support structure comprising an insert fitted into a composite sandwich panel with a fixture received in the insert.
Figure 11B:
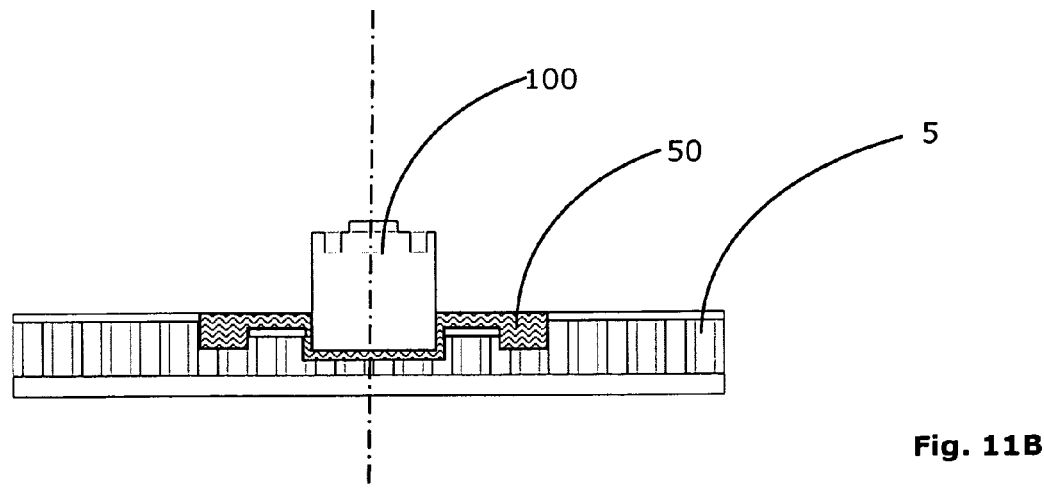
FIG. 11B a lateral cross section of a lightweight support structure comprising an insert fitted into a composite sandwich panel with a fixture received in the insert.

FIGS. 11A and 11B show a perspective respectively a lateral cross section of a lightweight support structure 1 comprising an insert 50 fitted into a composite sandwich panel 5 with a fixture 100 received in the insert 50. The combined effect of resting the insert connecting portion 53 on the support face sheet disc 42 of the support 40; the precise fit of the inner insert ring 51 and outer insert ring 52 of the insert 50 into the inner cut-out 31 respectively outer cut-out 32 of composite sandwich panel 5 allows stable anchorage of the fixture 100 while transferring loads into the structure of the composite sandwich panel 5.

It will be understood that many variations could be adopted based on the specific structure and method hereinbefore described without departing from the scope of the invention as defined in the following claims.

REFERENCE LIST:

| | |
|---|---|
| lightweight support structure | 1 |
| composite sandwich panel | 5 |
| first face sheet | 10 |
| lightweight core | 15 |
| second face sheet | 20 |
| cut-out | 30 |
| inner cut-out | 31 |
| outer cut-out | 32 |
| support | 40 |
| core support | 41 |
| support face sheet disc | 42 |
| insert | 50 |
| inner insert ring | 51 |

-continued

REFERENCE LIST:

| | |
|---|---|
| tapered portion (of inner insert ring) | 51.5 |
| outer insert ring | 52 |
| tapered portion (of outer insert ring) | 52.5 |
| insert connecting portion | 53 |
| insert trench | 54 |
| insert receiving area | 55 |
| adhesive | 56 |
| channel | 57 |
| cutter tool | 70 |
| inner cutting ring | 71 |
| outer cutting ring | 72 |
| fixture | 100 |

The invention claimed is:

1. A lightweight support structure (1) comprising:
a composite sandwich panel (5) comprising:
a first face sheet (10);
a lightweight core (15) attached to the first face sheet (10);
an optional second face sheet (20) attached to the lightweight core (15) opposite the first face sheet (10) when present; and
an essentially rotationally symmetric cut-out (30) extending through the first face sheet (10) and into said lightweight core (15);
a rotationally symmetric insert (50) fitted into said cut-out (30) for at least one of load application and anchorage of components to the composite sandwich panel (5), characterized in that:
the cut-out (30) comprises an essentially rotationally symmetric inner cut-out (31) and an essentially rotationally symmetric outer cut-out (32) arranged essentially concentric with respect to each other, providing for a support (40) there between; and
said support (40) comprises a core support (41) cut from said lightweight core (15) and a support face sheet disc (42) on top, cut from of said first face sheet (10).

2. A lightweight support structure (1) according to claim 1,
characterized in that said insert (50) comprises:
an inner insert ring (51) configured to be receivable within the inner cut-out (31) of the composite sandwich panel (5);
an outer insert ring (52) configured to be receivable within the outer cut-out (32) of the composite sandwich panel (5),
wherein said outer insert ring (52) is arranged with respect to said inner insert ring (51) so as to provide an insert trench (54) there between for receiving the support (40) of the composite sandwich panel (5);
an insert connecting portion (53) connecting said inner insert ring (51) with said outer insert ring (52), configured to be restable on the support face sheet disc (42) of the support (40); and
an insert receiving area (55) for receiving a fixture (100) for at least one of attaching and anchoring of components at least one of into and onto the composite sandwich panel (5).

3. A lightweight support structure (1) according to claim 2, characterized in that an adhesive (56) is provided in said insert trench (54) and the insert (50) comprises at least one channel (57) extending from said trench (54) through the outer insert ring (52), configured such that upon fitting of the insert (50) into the cut-out (30) of the composite sandwich panel (5), the support face sheet disc (42) forces said adhesive (56) through said at least one channel (57).

4. Method of producing a lightweight support structure (1) according to claim 3,
characterized in that said inner cut-out (31) and outer cut-out (32) are self-cut into the composite sandwich panel (5) by rotation of the insert (50) around its symmetry axis, wherein the inner insert ring (51) and outer insert ring (52) of the insert (50) are at least partially provided with at least one of an abrasive coating and a saw-tooth geometry.

5. A lightweight support structure (1) according to claim 1 characterized in that the insert (50) is a self-cutting insert, its inner insert ring (51) and outer insert ring (52) being provided with at least one of an abrasive coating and a saw-tooth geometry configured such that—by rotation of the insert (50) around its symmetry axis—at least one of said inner cut-out (31) and said outer cut-out may be cut.

6. A lightweight support structure (1) according to claim 1, characterized in that the insert (50) is fixed into the cut-out (30) of the composite sandwich panel (5) by at least one of: form-fitting, force-fitting, soldering, brazing, welding, and an adhesive.

7. A lightweight support structure (1) according to claim 1, wherein the core support (41) is compressed so as to allow said insert (50) to lie flatly inside the composite sandwich panel (5).

8. A lightweight support structure (1) according to claim 1, characterized in that said insert (50) comprises:
an inner insert ring (51) configured to be receivable within the inner cut-out (31) of the composite sandwich panel (5);
an outer insert ring (52) configured to be receivable within the outer cut-out (32) of the composite sandwich panel (5),
wherein said outer insert ring (52) is arranged with respect to said inner insert ring (51) so as to provide an insert trench (54) there between for receiving the support (40) of the composite sandwich panel (5); and
an insert connecting portion (53) connecting said inner insert ring (51) with said outer insert ring (52), configured to be restable on the support face sheet disc (42) of the support (40).

9. Method of producing a lightweight support structure (1) comprising the steps:
providing a composite sandwich panel (5) comprising:
a first face sheet (10), and
a lightweight core (15) attached to the first face sheet (10),
cutting an essentially rotationally symmetric inner cut-out (31) and an essentially rotationally symmetric outer cut-out (32) into said composite sandwich panel (5) by cutting through the first face sheet (10) and into said lightweight core (15), wherein the inner cut-out (31) and the outer cut-out (32) are arranged essentially concentric with respect each other,
characterized by the steps of:
by cutting said inner cut-out (31) and outer cut-out (32), providing a support (40) inbetween, said support (40) comprising a core support (41) cut from said lightweight core (15) and a support face sheet disc (42) on top, cut from of said first face sheet (10);
fitting a rotationally symmetric insert (50) into said cut-out (30) for at least one of load application and anchorage of components to the composite sandwich panel (5),
wherein said cut-out (30) is configured for receiving a rotationally symmetric insert (50) for at least one of load application and anchorage of components to the composite sandwich panel (5); and wherein said support (40) is configured for stabilizing said insert (50) within the composite sandwich panel (5).

10. Method of producing a lightweight support structure (1) according to claim 9,
characterized in that the step of fitting said insert (50) into said cut-out (30) comprises:
fitting an inner insert ring (51) of the insert (50) into the inner cut-out (31) of the composite sandwich panel (5);
fitting an outer insert ring (52) of the insert (50) into the outer cut-out (32) of the composite sandwich panel (5);
resting an insert connecting portion (53) connecting said inner insert ring (51) with said outer insert ring (52) on the support face sheet disc (42) of the support (40) wherein upon being fitted, the insert (50) being self-aligned with the cut-out (30).

11. Method of producing a lightweight support structure (1) according to claim 10, characterized in that the step of fitting said insert (50) into said cut-out (30) further comprises the following steps:
a) compressing said core support (41) by means of said insert connecting portion (53) exercising pressure on the support face sheet disc (42), the core support (41) being compressed by a compression ($\Delta$) equal to a thickness (D) of said insert connecting portion (53);
b) measuring an unevenness (U) between a top surface of the insert (50) and a top surface of the first face sheet (10);
c) increasing said a compression ($\Delta$);
d) repeating steps a) to c) until said unevenness (U) is below a predetermined unevenness tolerance.

12. Method of producing a lightweight support structure (1) according to claim 10, characterized in that the step of fitting said insert (50) into said cut-out (30) further comprises the following steps:
a) compressing said core support (41) by means of said insert connecting portion (53) exercising pressure on the support face sheet disc (42), the core support (41) being compressed by a compression ($\Delta$) equal to a thickness (D) of said insert connecting portion (53);
b) measuring an unevenness (U) between a top surface of the insert (50) and a top surface of the first face sheet (10);
c) increasing said compression ($\Delta$); and
d) repeating steps a) to c) until the insert (50) lies flatly inside said composite sandwich panel (5).

13. Method of producing a lightweight support structure (1) according to claim 9,
characterized in that said rotationally symmetric insert (50) is fixed into the cut-out (30) of the composite sandwich panel (5) by at least one of: form-fitting, force-fitting, soldering, brazing, welding, and an adhesive.

14. Method of producing a lightweight support structure (1) according to claim 9,
characterized in that said inner cut-out (31) and outer cut-out (32) are cut into the composite sandwich panel (5) by means of a cutter tool (70) comprising an inner cutting ring (71) and an outer cutter ring (72) correspondingly respectively to said inner cut-out (31) and said outer cut-out (32).

15. Method of producing a lightweight support structure (1) according to claim 9,
characterized in that the step of fitting said insert (50) into said cut-out (30) comprises:
fitting an inner insert ring (51) of the insert (50) into the inner cut-out (31) of the composite sandwich panel (5);
fitting an outer insert ring (52) of the insert (50) into the outer cut-out (32) of the composite sandwich panel (5);
resting an insert connecting portion (53) connecting said inner insert ring (51) with said outer insert ring (52) on the support face sheet disc (42) of the support (40) wherein upon being fitted, the insert (50) is self-aligned with the cut-out (30) by one of a tapered conical section (51.5) of the inner insert ring (51) and a tapered conical section (52.5) of the outer insert ring (52).

16. A composite sandwich panel (5) comprising:
a first face sheet (10);
a lightweight core (15) attached to said first face sheet (10); and
an optional second face sheet (20) attached to the lightweight core (15) opposite the first face sheet (10) when present;
wherein:
the composite sandwich panel (5) is provided with rotationally symmetric cut-out (30) extending through the first face sheet (10) and into said lightweight core (15);
the insert cut-out (30) comprises a rotationally symmetric inner cut-out (31) and a rotationally symmetric outer cut-out (32) arranged concentric with respect to each other, providing for a support (40) inbetween, comprising a core support (41) cut from said lightweight core (15), and a support face sheet disc (42) cut from of said first face sheet (10);
said cut-out (30) is configured for receiving a rotationally symmetric insert (50) for at least one of load application and anchorage of components to the composite sandwich panel (5); and
said support (40) is configured for stabilizing said insert (50) within the composite sandwich panel (5).

17. Method of producing a composite sandwich panel (5) comprising the steps:
providing a composite sandwich panel (5) comprising:
a first face sheet (10);
a lightweight core (15) attached to the first face sheet (10);
an optional second face sheet (20) attached to the lightweight core (15) opposite the first face sheet (10) when present;
cutting an essentially rotationally symmetric inner cut-out (31) and an essentially rotationally symmetric outer cut-out (32) into said composite sandwich panel (5) by cutting through the first face sheet (10) and into said lightweight core (15), wherein the inner cut-out (31) and the outer cut-out (32) are arranged essentially concentric with respect each other,
by cutting said inner cut-out (31) and outer cut-out (32), providing a support (40) inbetween, said support (40) comprising a core support (41) cut from said lightweight core (15), and a support face sheet disc (42) on top cut from of said first face sheet (10);
shaping the inner cut out (31) and the outer cut-out (32) for receiving a rotationally symmetric insert (50) for at least one of load application and anchorage of components to the composite sandwich panel (5); and
shaping said support (40) for stabilizing said insert (50) when present within the composite sandwich panel (5).

18. Method of producing a composite sandwich panel (5) according to claim 17, characterized in that said inner cut-out (31) and outer cut-out (32) are self-cut into the composite sandwich panel (5) by an inner insert ring (51) and an outer insert ring (52) of an insert (50) for at least one of load application and anchorage of components to the composite sandwich panel (5), by rotation of said insert (50) around its symmetry axis,
wherein at least one of said inner insert ring (51) and said outer insert ring (52) are provided with at least one of an abrasive coating and a saw-tooth geometry.

19. Method of producing a composite sandwich panel (5) according to claim 17, characterized in that said inner cut-out (31) and outer cut-out (32) are cut into the composite sandwich panel (5) by means of a cutter tool (70) comprising an inner cutting ring (71) and an outer cutter ring (72) corresponding, respectively, to said inner cut-out (31) respectively and said outer cut-out (32).

20. The method of claim 17, further comprising:
providing said rotationally symmetric insert (50), and
anchoring at least part of the insert (50) in at least one of the inner cut-out (31) and the outer cut-out (32) by at least one of form-fitting and force-fitting.

* * * * *